United States Patent
Gao et al.

(10) Patent No.: US 10,061,072 B2
(45) Date of Patent: Aug. 28, 2018

(54) BACKLIGHT MODULE HAVING OPTICAL MEMBRANE FILTER FOR SELECTIVELY DIRECTING LIGHT TOWARDS A DISPLAY PANEL

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Fei Gao, Beijing (CN); Wenming Ren, Beijing (CN); Kai Wang, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 142 days.

(21) Appl. No.: 15/155,602

(22) Filed: May 16, 2016

(65) Prior Publication Data
US 2017/0082791 A1    Mar. 23, 2017

(30) Foreign Application Priority Data
Sep. 22, 2015   (CN) .......................... 2015 1 0608594

(51) Int. Cl.
*F21V 8/00* (2006.01)
*G02F 1/1335* (2006.01)

(52) U.S. Cl.
CPC ....... *G02B 6/005* (2013.01); *G02F 1/133621* (2013.01); *G02F 1/133615* (2013.01); *G02F 2001/133624* (2013.01)

(58) Field of Classification Search
CPC ...................................................... G02B 6/005
See application file for complete search history.

(56) References Cited

U.S. PATENT DOCUMENTS

| | | | | |
|---|---|---|---|---|
| 5,488,497 A | * | 1/1996 | Takanashi | G02F 1/133345 349/106 |
| 8,451,402 B2 | * | 5/2013 | Oshima | G02F 1/133603 313/501 |
| 2003/0098936 A1 | * | 5/2003 | Oh | G02B 6/0036 349/65 |
| 2005/0186408 A1 | | 8/2005 | Condo et al. | |
| 2015/0301257 A1 | * | 10/2015 | Choi | C09K 11/025 362/607 |

FOREIGN PATENT DOCUMENTS

TW     200914934 A    4/2009

OTHER PUBLICATIONS

First Office Action for Chinese Application No. 201510608594.9, dated Aug. 23, 2017, 5 Pages.

(Continued)

*Primary Examiner* — Robert May
(74) *Attorney, Agent, or Firm* — Brooks Kushman P.C.

(57) ABSTRACT

The present disclosure provides a backlight module and a display device. The backlight module includes a backlight source, a light guide plate, and an optical membrane configured to filter out a light beam from the backlight source other than predetermined light beams and direct the predetermined light beams toward a display panel.

15 Claims, 1 Drawing Sheet

(56) References Cited

OTHER PUBLICATIONS

"Fabry-Pérot Interferometer," Wikipedia (definition), last modified Jul. 14, 2016, https://en.wikipedia.org/w/index.php?title=Fabry-Pérot_interferometer&oldid=729803016, 9 Pages.
Temple-Boyer, P. et al., "Residual Stress in Low Pressure Chemical Vapor Deposition SiNx Films Deposited From Silane and Ammonia," J. Vac. Sci. Technol. A 16(4), Jul./Aug. 1998 American Vacuum Society, 2003, 5 Pages.

\* cited by examiner

BACKLIGHT MODULE HAVING OPTICAL MEMBRANE FILTER FOR SELECTIVELY DIRECTING LIGHT TOWARDS A DISPLAY PANEL

CROSS-REFERENCE TO RELATED APPLICATION

The present application claims a priority of the Chinese Patent Application No.201510608594.9 filed on Sep. 22, 2015, which is incorporated herein by reference in its entirety.

TECHNICAL FIELD

The present disclosure relates to the field of display technology, in particular to a backlight module and a display device.

BACKGROUND

Gamut of a thin film transistor liquid crystal display (TFT-LCD) has an important influence on a display effect of the display, and during the product design, the gamut may be met as an important optical parameter. For the TFT-LCD, a color display mode of the display is mainly achieved by a color filter substrate, and the gamut of the display totally depends on the spectral selectivity of the color filter substrate.

In the related art, light beams passing through the red (R), green (G) and blue B) color filter layers each have a relatively wide spectrum, and the light beams passing through the adjacent color filter layers (e.g., a red light beam and a green light beam, or a green light beam and a blue light beam) may overlap each other, and as a result, the gamut of the display may be remarkably degraded. However, there is no effective scheme in the related art to prevent the occurrence of spectral overlap for the color filter substrate.

SUMMARY

A main object of the present disclosure is to prevent the occurrence of spectral overlap for R, G and B color filter layers, thereby to increase gamut as well as a display effect of a TFT-LCD.

In one aspect, the present disclosure provides in some embodiments a backlight module, including a backlight source, a light guide plate, and an optical membrane configured to filter out a light beam from the backlight source other than predetermined light beams and direct the predetermined light beams toward a display panel.

Alternatively, the optical membrane is arranged on a light-emitting surface of the backlight source, a light-entering surface of the light guide plate, and/or a light-exiting surface of the light guide plate.

Alternatively, the optical membrane includes a base film and, one on top of the other, a plurality of spectrum-selective films of at least two types.

Alternatively, the spectrum-selective films includes a first spectrum-selective film and a second spectrum-selective film, the first spectrum-selective film includes a SiNx film, and the second spectrum-selective film includes a polymethyl methacrylate (PMMA) film.

Alternatively, the optical membrane includes, one on top of the other, three SiNx films and two PMMA films arranged alternatively.

Alternatively, the SiNx films have an identical thickness.

Alternatively, each SiNx film has a thickness of 670 nm to 690 nm.

Alternatively, each SiNx film has a thickness of 680 nm.

Alternatively, the PMMA films have an identical thickness.

Alternatively, each PMMA film has a thickness of 90 nm to 110 nm.

Alternatively, each PMMA film has a thickness of 100 nm.

Alternatively, the base film is made of PMMA.

Alternatively, the predetermined light beams are red, green and blue light beams, or red, green, blue and white light beams.

In another aspect, the present disclosure provides in some embodiments a display device including a color filter substrate and the above-mentioned backlight module. Predetermined light beams obtained after filtering light beams by an optical membrane of the backlight module have colors corresponding to those of color filter layers of the color filter substrate.

According to the backlight module and the display device in the embodiments of the present disclosure, it is able to perform the spectral selection before the light beams from the backlight source reach the color filter layers and prevent the R, G and B light beams passing through the color filter layers from overlapping each other, thereby to improve the gamut of the TFT-LCD and control the gamut in a flexible manner.

DETAILED DESCRIPTION OF THE EMBODIMENTS

Figure 1:
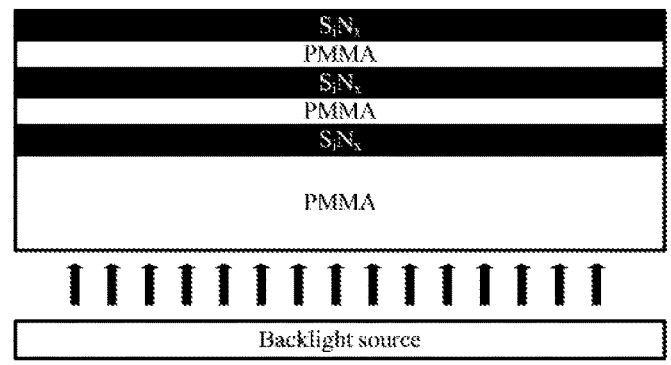
FIG. 1 is a schematic view showing an optical membrane of a backlight module according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Currently, for a color filter substrate of a conventional TFT-LCD, light beams passing the red (R), green (G) and blue (B) color filter layers each have a relatively wide spectrum and may overlap each other, so it is impossible to increase the gamut of the TFT-LCD. In addition, the gamut of the TFT-LCD totally depends on the spectral selectivity of the color filter substrate, and it is very difficult to improve the gamut of the TFT-LCD by improve the performance of the color filter substrate.

However, it is able to improve the gamut in the case that the spectral selection may be performed before the light beams from the backlight source reach the color filter substrate. Hence, an optical assembly capable of filtering the light beams (also called as a color filter membrane) may be arranged at a light-emitting surface of the backlight source, a light-entering surface of a light guide plate or a light-exiting surface of the light guide plate. In order to perform spectral selection in a better manner, the color filter membranes may be arranged at two or three of the light-emitting surface of the backlight source, the light-entering surface of the light guide plate or the light-exiting surface of the light guide plate. In this way, it is able to filter out the light beams in the other colors before the light beams reach the color filter substrate, narrow the spectrums of the R, G and B light beams passing through the color filter layers, and prevent the R, G and B light beams from overlapping each other, thereby to improve the gamut of the TFT-LCD.

The present disclosure provides in some embodiments a backlight module, which includes a backlight source, a light guide plate, and an optical membrane configured to filter out a light beam from the backlight source other than predetermined light beams and direct the predetermined light beams toward a display panel. Here, the optical membrane functions in a way identical to the above-mentioned color filter membrane.

The predetermined light beams may be set in accordance with the practical need. For example, in the case that merely R, G and B light beams are capable of passing through color filter layers of a color filter substrate, the predetermined light beams may include the R, G and B light beams. In the case that R, G, B and white (W) light beams are capable of passing through the color filter layers of the color filter substrate, the predetermined light beams may include the R, G, B and W light beams. Of course, the predetermined light beams may also include the light beams in any other colors which may less affect the R, G, B and W light beams (i.e., which have spectra close to those of the R, G, B and W light beams).

In the embodiments of the present disclosure, the optical membrane may be arranged on a light-emitting surface of the backlight source, a light-entering surface of the light guide plate, and/or a light-exiting surface of the light guide plate. That is, the optical membrane may be arranged on any one or more of the positions where the light beam may be filtered.

In the embodiments of the present disclosure, the optical membrane is configured to filter the light beams and capable of allowing the R, G and B light beams to pass therethrough at excellent light transmittance. In order to control the light transmittance of the desired light beams (i.e., the predetermined light beams) accurately, it is necessary to select materials for forming the optical membrane, contents of the materials, and a thickness of the materials. A large number of experiments have been carried out by the inventor so as to find out the desired optical membrane. The optical membrane will be described hereinafter with reference FIG. 1.

The optical membrane will be briefly described hereinafter. The optical membrane consists of a plurality of layers, and plays an important role in spectacles, lenses and scientific researches. Optical resonant cavities may be formed between the adjacent layers, and based on the optical interference principle, these optical resonant cavities may be used to filter the light beams. The light transmittance of the optical membrane may be adjusted by selecting materials of the layers, a thickness of each layer and the number of the layers. Through the optical membrane, it is able to obtain the desired light beams.

In order to improve the gamut of a display device, the optical film used by the optical membrane may exhibit excellent sensitivity to the predetermined light beams, and may have high light transmittance and contrast. Taking R, G and B color filter layers of a color filter substrate as an example, the optical film shall have high light transmittance for the R, G and B light beams, and the spectra of the light beams passing through the optical film shall be capable of overlapping the spectra of the light beams passing through the R, G and B color filter layers. In addition, the optical film may be made of a material with a high refractive index, so as to improve its filtration effect.

In the embodiments of the present disclosure, the optical membrane may include a base film and, one on top of the other, a plurality of spectrum-selective films of at least two types.

Currently, the commonly-used spectrum-selective film is thin and shall be formed on the base film, so as to simplify a manufacture process or an attachment process. Usually, the base film has a thickness greater than the spectrum-selective film. In addition, the thickness of the base film is not particularly defined herein, and it may be set in accordance with a hardness of the optical membrane. For example, in the case that the optical membrane with a small hardness is required, the base film may be provided with a small thickness, and in the case that the optical membrane with a large hardness is required, the base film may be provided with a large thickness.

Alternatively, the spectrum-selective films may include a first spectrum-selective film and a second spectrum-selective film, the first spectrum-selective film may include a SiNx film, and the second spectrum-selective film may include a PMMA film. Of course, during the actual application, three, four or more kinds of the spectrum-selective films may be used in accordance with the practical need.

In addition, although the SiNx film and the PMMA film are selected as the first spectrum-selective film and the second spectrum-selective film respectively, during the actual application, the first spectrum-selective film and the second spectrum-selective film may also be made of any other materials, as long as the practical need may be met.

Alternatively, the optical membrane may include, one on top of the other, three SiNx films and two PMMA films arranged alternatively, so as to improve the filtration effect. Here, the SiNx films may be of an identical thickness, and the PMMA films may also be of an identical thickness. It should be appreciated that, the number of the PMMA films and the SiNx films may be set in accordance with the practical need, and they may not be arranged alternately either. For example, the optical membrane may include two SiNx films and four PMMA films, as long as the desired filtration effect may be achieved.

Alternatively, each SiNx may have a thickness of 670 nm to 690 nm, e.g., 680 nm, so as to improve the filtration effect.

Each PMMA may have a thickness of 90 nm to 110 nm, e.g., 100 nm, so as to improve the filtration effect. Experiments show that a better filtration effect may be achieved in the case of the above-mentioned thicknesses.

In the embodiments of the present disclosure, the materials and the thickness of the base film may be selected in accordance with the practical need. Alternatively, the base film may be made of PMMA. PMMA has excellent light transmittance and a good refractive index, so it is able to improve the light transmittance and refractive index of the entire optical membrane.

Figure 2:
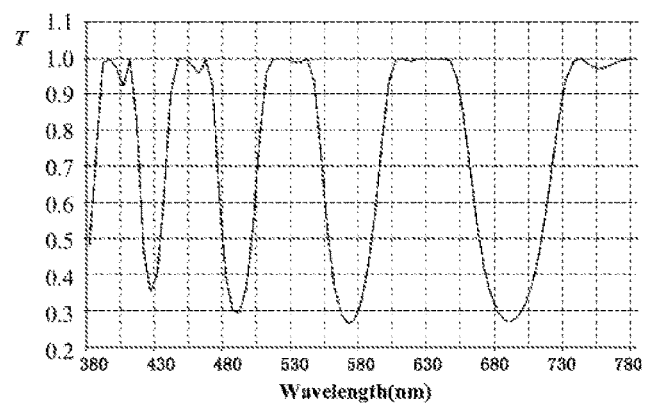
FIG. 2 is a curve diagram of light transmittance of the optical membrane of the backlight module according to one embodiment of the present disclosure.

FIG. 1 shows the arrangement mode, the materials and the thicknesses of the films optical membrane. In the optical membrane, the PMMA base film has a relatively large thickness, so as to support the optical films. The thickness of the base film may be adjusted, and the light transmittance of the other films may be less affected by the base film. Five films, i.e., the SiNx film, the PMMA film, the SiNx film, the PMMA film and the SiNx with thicknesses of 680 nm, 100 nm, 680 nm, 100 nm and 680 nm respectively, are sequentially formed on the PMMA base An optical simulation resultant of the optical membrane in FIG. 1 will be described hereinafter. FIG. 2 shows a light transmittance curve for the optical membrane in FIG. 1 obtained through simulation, where the SiNx film has a refractive index of 2.30 and the PMMA film has a refractive index of 1.49. As shown in FIG. 2, it is able for the optical membrane to allow the R, G and B light beams to pass therethrough at high light transmittance.

The filtration effect of the optical membrane will be tested as follows, where a light-emitting diode (LED) is selected as the backlight source, and there color filter layers R8880, G8880 and B8880 (each with a thickness of 2 μm) are used. Table 1 shows the gamut of the backlight module without any optical membrane, and Table 2 shows the gamut of the backlight module with the optical membrane. As can be seen from Table 1 and Table 2, in the case that the backlight module is provided with the optical membrane, the gamut is increased from 66.30% to 75.88%.

TABLE 1

|  | R8880-B5 R | G8880-B5 G | B8880-B5 B | W |
|---|---|---|---|---|
| dRGB (μm) | 2.00 | 2.00 | 2.00 | |
| x | 0.612 | 0.294 | 0.155 | 0.265 |
| y | 0.319 | 0.608 | 0.075 | 0.259 |
| Y | 16.4 | 54.0 | 13.7 | 28.0 |
| Correlated Color Temperature (CCT) | 15046 | Minimum Perceptible Color Difference (MPCD) | 14.0 | 66.30% |

TABLE 2

|  | R8880-B5 R | G8880-B5 G | B8880-B5 B | W |
|---|---|---|---|---|
| dRGB (μm) | 2.00 | 2.00 | 2.00 | |
| x | 0.620 | 0.249 | 0.154 | 0.254 |
| y | 0.312 | 0.637 | 0.072 | 0.239 |
| Y | 14.5 | 39.1 | 12.0 | 21.9 |
| CCT | 24427 | MPCD | 24.2 | 75.88% |

The thickness of the optical membrane almost depends on the thickness of the base film. Through changing the thickness of the base film, it is able to provide a flexible optical membrane that may be attached onto any other component, or a hard optical membrane that may be mounted directly. The optical membrane is of a small size, so it almost has no influence on a size of a final product.

The optical membrane may be arranged on the light-emitting surface of the backlight source, the light-entering surface of the light guide plate and/or the light-exiting surface of the light guide plate. In this way, it is able to perform the spectral selection before the light beams from the backlight source reach the color filter substrate, and filter out the undesired light beams, thereby to improve the gamut of the display device.

Figure 3:
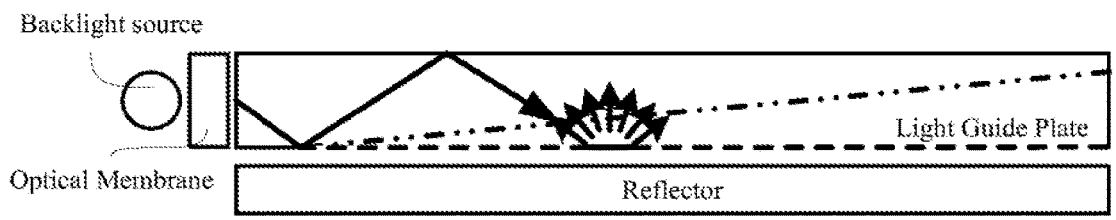
FIG. 3 is a schematic view showing the backlight module according to one embodiment of the present disclosure.

During the actual application, the optical membrane may be manufactured in various film-forming methods. As shown in FIG. 3, the optical membrane may be directly arranged between an edge-type backlight source and the light guide plate, so as to filter the light beams from the backlight source. In other words, the optical membrane may be mounted conveniently. Here, the backlight module may further include a reflector.

The present disclosure further provides in some embodiments a display device including a color filter substrate and the above-mentioned backlight module. The predetermined light beams obtained after filtering the light beams by an optical membrane of the backlight module have colors corresponding to those of color filter layers of the color filter substrate. In other words, in the case that merely the R, G and B light beams pass through the color filter layers of the color filter substrate, the predetermined light beams may include R, G and B light beams. In this way, before the light beams from the backlight source reach the color filter substrate, the light beams in the other colors may be filtered out to the greatest extent, so as to prevent the R, G and B light beams from overlapping each other, thereby to improve the gamut of the display device. The display device may be any product or member having a display function, such as a mobile phone, a flat-panel computer, a television, a display, a laptop computer, a digital photo frame or a navigator.

According to the embodiments of the present disclosure, it is able to perform the spectral selection for the light beams from the backlight source before they reach the color filter substrate. As a result, it is able to prevent the R, G and B light beams passing through the color filter layers from overlapping each other, thereby to improve the gamut of the TFT-LCD and control the gamut in a flexible manner.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:
1. A backlight module, comprising:
a backlight source;
a light guide plate; and
an optical membrane configured to filter out a light beam from the backlight source other than predetermined light beams and direct the predetermined light beams toward a display panel,
wherein the optical membrane comprises a base film and, one on top of the other, a plurality of spectrum-selective films of at least two types, the spectrum-selective films comprises a first spectrum-selective film and a second spectrum-selective film, the first spectrum-selective film comprises a $Si_xN_x$ film, and the second spectrum-selective film comprises a polymethyl methacrylate (PMMA) film, and the optical membrane comprises, one on top of the other, three $Si_xN_x$ films and two PMMA films arranged alternatively.

2. The backlight module according to claim 1, wherein the optical membrane is arranged on a light-emitting surface of the backlight source, a light-entering surface of the light guide plate, and/or a light-exiting surface of the light guide plate.

3. The backlight module according to claim 1, wherein the SiNx films have an identical thickness.

4. The backlight module according to claim 3, wherein each SiNx film has a thickness of 670 nm to 690 nm.

5. The backlight module according to claim 4, wherein each SiNx film has a thickness of 680 nm.

6. The backlight module according to claim 1, wherein the PMMA films have an identical thickness.

7. The backlight module according to claim 6, wherein each PMMA film has a thickness of 90 nm to 110 nm.

8. The backlight module according to claim 7, wherein each PMMA film has a thickness of 100 nm.

9. The backlight module according to claim 1, wherein the base film is made of PMMA.

10. The backlight module according to claim 1, wherein the predetermined light beams are red, green and blue light beams, or red, green, blue and white light beams.

11. A display device, comprising a color filter substrate and the backlight module according to claim 1, wherein the predetermined light beams have colors corresponding to those of color filter layers of the color filter substrate.

12. The display device according to claim 11, wherein the optical membrane is arranged on a light-emitting surface of the backlight source, a light-entering surface of the light guide plate, and/or a light-exiting surface of the light guide plate.

13. The display device according to claim 11, wherein the SiNx films have an identical thickness of 680 nm, and the PMMA films have an identical thickness of 100 nm.

14. The display device according to claim 11, wherein the base film is made of PMMA.

15. The display device according to claim 11, wherein the predetermined light beams are red, green and blue light beams, or red, green, blue and white light beams.

* * * * *